United States Patent Office 3,756,947
Patented Sept. 4, 1973

3,756,947
PROCESS FOR TREATING WASTE WATER
CONTAINING NITRILES
Yoshitsugu Fujii, Tokyo, and Tokuichi Oshimi, Hiratsuka, Japan, assignors to Sumitomo Shipbuilding & Machinery Co., Ltd., Tokyo, Japan
No Drawing. Filed Sept. 13, 1971, Ser. No. 180,081
Claims priority, application Japan, Dec. 9, 1970, 45/108,452
Int. Cl. C02c 5/10
U.S. Cl. 210—11      7 Claims

ABSTRACT OF THE DISCLOSURE

A waste water effluent containing nitriles and cyanides is treated by passing through an acclimated, activated sludge containing at least one of microorganisms capable of degrading nitriles and cyanides selected from the genera Alcaligenes and Achromobacter, for example, *Alcaligenes viscolactis* ATCC 21698 and *Achromobacter nitriloclastes* ATCC 21697 thereby to purify the waste water effluent. The waste water effluent containing 10 to 50 p.p.m. of cyanide and 1,000 to 2,500 p.p.m. of COD (Potassium Dichromate Method) can be purified with a high efficiency.

---

This invention relates to a process for treating waste water containing nitriles, and more particularly to a process for treating industrial waste water containing nitriles such as acetonitrile, acrylonitrile, propionitrile, and succinonitrile and cyanides such as sodium cyanide and potassium cyanide by an activated sludge containing microorganisms capable of degrading nitriles and cyanides.

Water pollution, that is, pollution of river, lake, sea, etc., by waste water effluents from various industries due to the development of industries has been recently a serious problem. To solve such a serious problem, various processes for treating the waste water have been proposed and practiced. Among these processes, a process based on activated sludge has been recently applied to the treatment of industrial waste water and has been found to attain a remarkable effect. However, waste water containing nitriles and cyanides, the sparingly degradable and toxic compounds, which are slow in degradation by microorganisms, for example, a waste water from the production of acrylonitrile, cannot be treated by the so-called ordinary activated sludge. For example, according to the experiences of the present inventors it is impossible in the case of strongly toxic waste water containing sparingly degradable compounds such as waste water effluents from the production of acrylonitrile to obtain an activated sludge capable of degrading nitriles and cyanides by acclimating the microorganisms to the activated sludge for 2 to 3 months even in a small laboratory-scale test, that is, by subjecting an activated sludge of sewage treatment plant as a seed to waste water containing nitriles and cyanides little by little under aerobic conditions and gradually acclimating the microorganisms to the sludge to obtain a new type of activated sludge.

An object of the present invention is to provide a process for effectively treating a waste water containing sparingly degradable and toxic nitriles. That is to say, the object of the present invention is to provide a process for treating a waste water containing nitriles and cyanides characterized by adding to an activated sludge at least one microorganism capable of degrading nitriles and cyanides selected from the genera Alcaligenes and Achromobacter, acclimating the microorganisms to the sludge and passing a waste water containing nitriles and cyanides through the activated sludge containing acclimated microorganisms thereby to purify the waste water.

According to the present invention, at least one microorganism capable of degrading nitriles and cyanides, selected from the genera Alcaligenes and Achromobacter is, first of all, added to an activated sludge to acclimate the microorganism to the sludge. Examples of the microorganisms capable of degrading nitriles and cyanides selected from the genera Alcaligenes and Archromobacter include *Alcaligenes viscolactis* S–2 ATCC 21698 (FERM–P No. 759) and *Achromobacter nitriloclastes* S–10 ATCC 21697 (FERM–P No. 760), these two strains having been isolated by the present inventors.

Diagnostic characteristics of the strains *Alcaligenes viscolactis* S–2 ATCC 21698 (FERM–P No. 759) and *Achromobacter nitriloclastes* S–10 ATCC 21697 (FERM–P No. 760) are given in Table 1.

TABLE 1.—DIAGNOSTIC CHARACTERISTICS

| Strain | *Alcaligenes viscolactis*, ATCC 21698 | *Acromobacter nitriloclastes*, ATCC 21697 |
|---|---|---|
| (a) Morphological characters: | | |
| (1) Shape and size of cells | Rod 1.0×1.75μ | Rod 1.25×1.5μ. |
| (2) Presence of pleomorphic cells | Single, diplo, short chain | Single, diplo, short chain. |
| (3) Motility | None | Yes. |
| (4) Presence and state of flagella | do | Fine flagella. |
| (5) Spore formation | do | None. |
| (6) Gram staining | (−) | (−). |
| (7) Acid fastness | None | None. |
| (b) Growth on nutrient agar media: | | |
| (1) Growth | (++++) | (++). |
| (2) Color of colony | Yellow | Yellowish white. |
| (3) Lustre of colony | Lustre | Dull. |
| (c) Physiological characters: | | |
| (1) Nitrate reduction | (−) | (+++). |
| (2) MR test | (−) | (±). |
| (3) VP test | (−) | (++). |
| (4) Indole formation | (−) | (−). |
| (5) Hydrogen sulfide formation | (±) | (+++). |
| (6) Starch hydrolyzation | (−) | (±). |
| (7) Catalase | (++++) | (++). |
| (8) Optimum pH for growth | 6–9 | 6–9. |
| (9) Optimum temperature for growth | 20°–35° C | 20°–35° C. |
| (10) Growth condition | Aerobic | Aerobic. |

TABLE 1—Continued

| Strain | Alcaligenes viscolactis, ATCC 21698 | Acromobacter nitriloclast, ATCC 21697 |
|---|---|---|
| (c) Physiological characters;—Continued | | |
| (11) Acid produced from saccharides: | | |
|     L-arabinose | (−) | (−). |
|     D-xylose | (−) | (−). |
|     D-glucose | (−) | (+). |
|     D-mannose | (−) | (−). |
|     D-fructose | (−) | (+). |
|     D-glactose | (−) | (−). |
|     Maltose | (−) | (+). |
|     Sucrose | (−) | (+). |
|     Lactose | (−) | (−). |
|     Trehalose | (−) | (−). |
|     D-sorbitol | (−) | (−). |
|     D-mannitol | (−) | (−). |
|     Inositol | (−) | (−). |
|     Glycerin | (−) | (+). |
|     Starch | (−) | (+). |
| (12) Other properties: | | |
|   (i) Cyanide fastness | (+++) | (++). |
|   (ii) Cyanide degradation | (+++) | (++). |
|   (iii) Nitrile fastness, for example, against acetonitrile, propionitrile, acrylonitrile, etc. | (+++) | (+++). |
|   (iv) Nitrile degradation, for example, acetonitrile, propionitrile, acrylonitrile, etc. | (+++) | (+++). |
|   (v) Floc formation | (±) | (++). |
|   (vi) Growth on litmus milk medium | (±) | (+). |

The strains *Alcaligenes viscolactis* S–2 ATCC 21698 (FERM–P No. 759) and *Achromobacter nitrilolastes* S–10 ATCC 21697 (FERM–P 760) were identified to belong to the genera Alcaligenes and Achromobacter, respectively, in view of the foregoing diagnostic characteristic according to "Bergey's Manual of Determinative Bacteriology," 7th edition. The strain *Alcaligenes viscolactis* S–2 was almost identical in the properties with the species *Alcaligenes viscolactis*, but was slightly different therefrom in the behavior on the litmus milk medium and acid produced from the saccharides. The strain had an ability to degrade nitrile and cyanide, which is not described in said Bergey's Manual. However, the strain S–2 was considerably identical in the properties with *Alcaligenes viscolactis* and was thus named as *Alcaligenes viscolactis* and deposited in Biseibutsu Kogyo Gizyutsu Kenkyuzyo (Research and Technical Institute of Microorganisms) of Kogyo Gizyutsuin (Industrial Science and Technology Agency), Japan, under a register number of FERM–P No. 759 and in American Type Culture Collection, 12301 Parklawn Drive, Rockville, Md., U.S.A., under a register number of ATCC 21698.

On the other hand, the strain *Achromobacter nitriloclastes* S–10 ATCC 21697 (FERM–P No. 760) seemed to belong to the species *Achromobacter cycloclastes* or *Achromobacter pestifer* in view of the foregoing properties according to said Bergey's Manual, but the strain had an ability to degrade the nitriles and naphthalenes, and thus could be deemed to belong to the species *Achromobacter cycloclastes* in view of the fact that the ability to degrade the naphthalene is an important diagnostic characteristic of *Achromobacter cycloclastes*. However, since the ability to degrade nitriles and cyanides was a property peculiar to the strain and further all the characteristics were not identical with those of the species *Achromobacter cycloclastes*, the strain was recognized as a new species, named *Achromobacter nitriloclastes* and deposited in Biseibutsu Kogyo Gizyutsu Kenkyuzyo (Research and Technical Institute of Microorganisms) of Kogyo Gizyutsuin (Industrial Science and Technology Agency), Japan, under a register number of FERM–P No. 760 and in American Type Culture Collection, U.S.A., under a register number of ATCC 21697.

These strains are mere examples of the microorganisms used in the present invention, and any microorganism belonging to the genera Alcaligenes and Achromobacter can be used, so long as it is capable of degrading nitriles and cyanides and propagating on an activated sludge.

When two or more microorganisms selected from the genera Alcaligenes and Achromobacter are used, two or more microorganisms belonging only to the genus Alcaligenes can be used, or two or more microorganisms belonging only to the genus Achromobacter can be used, or the microorganisms belonging to both genera Alcaligenes and Achromobacter can be used at the same time. In the last case, a relatively good result can be obtained.

In adding the microorganisms capable of degrading nitriles and cyanides selected from the genera Alcaligenes and Achromobacter to an activated sludge, a pure culture of the microorganisms is usually added thereto. The pure culture can be carried out according to the ordinary procedure for pure culture of microorganisms. For example, a liquid culture medium containing a carbon source including organic acids and nitrile compounds, a nitrogen source including inorganic nitrogen compounds such as urea, ammonium sulfate, etc. and organic nitrogen compounds such as corn-steep liquor (CSL), inorganic salts such as calcium phosphate and a compound fertilizer such as potassium ammonium phosphate, and other nutrients such as peptone, blackstrap molasses, etc. if necessary, which is suitable for the growth of said microorganisms, is placed in a culture tank and sterilized. Then, the culture medium is adjusted to a temperature suitable for the growth of the microorganisms, and inoculated with cells of said microorganisms separately grown and prepared on an agar slant singly or in a mixed state. Then, sterilized air is blown into the tank and the medium is stirred with a stirrer to bring the medium under aerobic growth conditions. Cells of said microorganisms are propagated singly or in a mixed state. At that time, the pH and temperature of the culture medium are kept suitable for the growth of said microorganisms. In this manner, a large amount of pure cultures of the desired microorganisms can be obtained. In carrying out the pure culture of said microorganisms, a good result can be obtained when pure culture of said microorganisms is carried out in a medium containing 0.001 to 0.003 w./v. percent of cyanides and 0.01 to 0.05 w./v. percent of nitriles.

Cultures of said microorganisms obtained in a large amount of the pure culture as mentioned above, or cells obtained from the cultures, are added to an activated sludge. The ordinary activated sludge, for example, activated sludge of sewage treatment plant, can be used as the activated sludge of the present invention.

The pure cultures or cells of said microorganisms are added to the activated sludge in the ordinary aeration tank. It is preferable to add the pure cultures thereto in a volume of approximately or more than one-tenth, based on the volume of aeration tank, or add cells corresponding to the volume of pure cultures.

In adding the pure culture of said microorganisms to the activated sludge, the pure culture can be directly added and acclimated to the activated sludge, if the microorganisms have a good coagulability. If the microorganisms have no coagulability when added to the activated sludge, a suitable coagulant, for example, ferric chloride, ferrous sulfate, calcium salt, organic polyelectrolyte, etc. is used to coagulate cells, and the coagulated cells are added, acclimated and propagated to the activated sludge. In this manner, an activated sludge applicable to a waste water effluent containing sparingly degradable substances such as a waste water effluent containing nitriles and cyanides can be prepared in a very short period of time. The waste water is then passed through the activated sludge containing the thus acclimated microorganism and purified according to the ordinary means and operational procedures as in the conventional activated sludge process. For example, a waste water containing nitriles and cyanides can be treated by passing the waste water containing nitriles and cyanides at a proper concentration, for example, a waste water having 10 to 50 p.p.m. of CN and 1,000 to 2,500 p.p.m. of COD (Potassium Dichromate Method) continuously through the activated sludge while keeping optimum conditions for decreasing BOD [optimum BOD loading such as 0.8 to 1.5 kg. BOD/m.$^3$.d., optimum oxygen supply such as 0.2 to 2.0 p.p.m. in DO (Dissolved Oxygen), optimum pH such as 7.0 to 8.5, and optimum temperature such as 20° to 30° C., with a supply of nutrients, etc., if necessary] and biologically degrading organic matters contained therein, as in the ordinary activated sludge process for obtaining the desired purified water.

Therefore in carrying out the present invention, no other complicated apparatus than a simple facility for carrying out pure culture of said microorganisms in a large amount is necessary for the conventional waste water treatment facility based on the activated sludge.

Now, the present invention will be explained in detail, referring to example.

EXAMPLE

*Alcaligenes viscolactis* S–2 ATCC 21698 (FERM–P No. 759) and *Achomobacter nitriloclastes* S–10 ATCC 21697 (FERM–P No. 760), strains capable of degrading nitriles and cyanides and being acclimated to activated sludge, which belonged to the genera Alcaligenes and Achromobacter, respectively, were seed-cultured singly or in a mixed state in 0.1 l. of sterilized medium of glucose nutrient broth containing 500 p.p.m. of acrylonitrile and 25 p.p.m. of sodium cyanide at 30° C. for 2 to 3 days, and the seed cultures were further cultured in 1 l. of sterilized medium having the same composition as above, whereby pure cultures were obtained in large amounts.

A coagulant was added to 1 l. of the thus obtained pure cultures when required, and the pure culture of said microorganisms were added rapidly to an activated sludge of sewage treatment, and acclimated and propagated on the sludge for about one week to obtain a new type of activated sludge. Waste water effluents containing nitriles and cyanides were passed through the thus obtained activated sludge under loads as shown in Tables 2 and 3, and good results were obtained as shown in Tables 2 and 3.

The results shown in Table 2 are based on the treatment of the waste water effluents containing nitriles and cyanides with acclimated activated sludge obtained by adding a pure single culture of *Alcaligenes viscolactis* S–2 ATCC 21698 (FERM–P No. 759), and the results shown in Table 3 are based on the treatment of the waste water effluents containing nitriles and cyanides with acclimated activated sludge obtained by adding a pure culture in a mixed state of both *Alcaligenes viscolactis* S–2 ATCC 21698 (FERM–P No. 759) and *Achomobacter nitriloclastes* S–10 ATCC 21697 (FERM–P No. 760).

TABLE 2

| Test run number | 1 | 2 | 3 | 4 |
|---|---|---|---|---|
| Loading: | | | | |
| Retention time (hour) | 24 | 24 | 24 | 18 |
| COD [1] loading (kg./m.$^3$/day) | 0.55 | 0.73 | 1.10 | 1.55 |
| BOD loading (kg./m.$^3$/day) | 0.60 | 0.80 | 1.20 | 1.60 |
| BOD-MLSS (Mixed liquor suspended solid) loading (kg./kg. MLSS/day) | 0.10 | 0.14 | 0.19 | 0.25 |
| Dilution (volume ratio) | 2 | 1.5 | 1 | 1 |
| Influent: | | | | |
| pH | 6.8 | 7.2 | 6.6 | 6.6 |
| COD [1] (p.p.m.) | 550 | 734 | 1,100 | 1,100 |
| COD [2] (p.p.m.) | 1,775 | 2,370 | 3,550 | 3,550 |
| BOD (p.p.m.) | 600 | 800 | 1,200 | 1,200 |
| CHN [3] (p.p.m.) | 10.5 | 14 | 21 | 21 |
| Effluent: | | | | |
| pH | 8.10 | 8.20 | 8.35 | 8.35 |
| COD [1] (p.p.m.) | 180 | 224 | 248 | 246 |
| COD [2] (p.p.m.) | 429 | 569 | 723 | 708 |
| BOD (p.p.m.) | 27.5 | 39.0 | 20.0 | 18.3 |
| HCN [3] (p.p.m.) | 0.21 | 0.09 | 0.06 | 0.10 |
| Efficiency: | | | | |
| COD [1] (percent) | 67.3 | 69.5 | 77.5 | 77.7 |
| COD [2] (percent) | 75.8 | 76.0 | 79.7 | 80.1 |
| BOD (percent) | 95.4 | 95.1 | 98.3 | 98.5 |
| HCN [3] (percent) | 98.0 | 99.4 | 99.7 | 99.5 |

[1] COD is based on COD determined by potassium permanganate method (JIS 15, pages 29–30; American Standard Methods 220, pages 495–499).
[2] COD is based on COD determined by potassium dichromate method JIS 13, pages 26–28).
[3] HCN is total cyanides determined by pyridine pyrazolone method [JIS K0102 (1971), pages 93–95, No. 29.2, pyridine pyrazolone; American Standard Methods, 13th edition (1971), 207C, pages 404–406].

TABLE 3

| Test run | 1 | 2 | 3 | 4 | 5 | 6 | 7 | 8 | 9 | 10 | 11 | 12 | 13 |
|---|---|---|---|---|---|---|---|---|---|---|---|---|---|
| Loading: | | | | | | | | | | | | | |
| Retention time (hour) | 24 | 24 | 24 | 24 | 24 | 24 | 24 | 24 | 24 | 24 | 24 | 24 | 24 |
| COD [1] loading (kg./m.$^3$/day) | 0.50 | 0.78 | 0.87 | 0.80 | 0.98 | 0.75 | 0.81 | 0.75 | 0.87 | 0.72 | 0.79 | 0.90 | 1.09 |
| COD [2] loading (kg./m.$^3$/day) | 1.06 | 1.46 | 1.95 | 1.86 | 2.17 | 1.42 | 1.82 | 1.75 | 2.03 | 1.42 | 1.68 | 1.71 | 1.91 |
| Dilution (volume ratio) | 3 | 2.3 | 2.4 | 2.4 | 2.4 | | | | | | | | |
| Influent: | | | | | | | | | | | | | |
| pH | 4.80 | 4.80 | 4.64 | 4.85 | 4.80 | 4.80 | 4.80 | 4.80 | 4.80 | 4.80 | 4.80 | 4.80 | 4.80 |
| COD [1] (p.p.m.) | 532 | 753 | 812 | 750 | 878 | 753 | 812 | 750 | 878 | 723 | 796 | 902 | 1094 |
| COD [2] (p.p.m.) | 1,131 | 1,420 | 1,825 | 1,750 | 2,035 | 1,420 | 1,825 | 1,750 | 2,035 | 1,424 | 1,683 | 1,718 | 1,914 |
| HCN [3] (p.p.m.) | 10.5 | 15.0 | 20.8 | 25.8 | 30.8 | 15.0 | 20.8 | 25.8 | 30.8 | 35.8 | 42.5 | 50 | 60 |
| Effluent: | | | | | | | | | | | | | |
| pH | 8.25 | 8.28 | 8.54 | 8.40 | 8.43 | 8.2 | 8.5 | 8.3 | 8.5 | 8.3 | 8.2 | 8.0 | 8.2 |
| COD [1] (p.p.m.) | 82 | 87 | 114 | 120 | 121 | 86 | 117 | 118 | 120 | 121 | 113 | 117 | 172 |
| COD [2] (p.p.m.) | 216 | 201 | 270 | 257 | 250 | 218 | 270 | 250 | 270 | 316 | 270 | 296 | 416 |
| HCN [3] (p.p.m.) | 0.085 | 0.095 | 0.108 | 0.112 | 0.112 | 0.195 | 0.108 | 0.112 | 0.112 | 0.208 | 0.225 | 0.225 | 0.228 |
| Efficiency: | | | | | | | | | | | | | |
| COD [1] (percent) | 84.6 | 88.4 | 86.0 | 84.0 | 86.2 | 88.6 | 85.6 | 84.3 | 86.3 | 83.3 | 85.8 | 88.0 | 84.3 |
| COD [2] (percent) | 80.9 | 85.9 | 85.2 | 85.4 | 87.8 | 84.6 | 85.2 | 85.3 | 86.7 | 78.8 | 84.0 | 82.8 | 78.3 |
| HCN [3] (percent) | 99.2 | 99.4 | 99.5 | 99.6 | 99.6 | 99.3 | 99.5 | 99.6 | 99.6 | 99.4 | 99.5 | 99.5 | 99.6 |

[1] COD is based on COD determined by potassium permanganate method.
[2] COD is based on COD determined by potassium dichromate method.
[3] HCN is total cyanides determined by pyridine pyrazolone method.

NOTE.—In test Runs Nos. 1–3, the amount of waste water having a higher HNC concentration was increased from test Run No. 1 to 3, and in test Runs Nos. 4 and 5 the waste water having a high HNC concentration was used.

When the same waste water effluents were treated with the ordinary activated sludge of sewage treatment under the same conditions, the waste water could not be treated at all even if the influent was considerably diluted. To obtain similar results as shown in Tables 2 and 3 with the ordinary activated sludge method, even in a small laboratory scale test, it was necessary to acclimate the ordinary activated sludge for three to six months.

According to the present invention, waste water effluent containing nitriles and cyanides, which has been deemed heretofore difficult to treat, can be purified very efficiently, and even in a newly-built factory, it is possible to treat the waste water rapidly with an acclimated activated sludge prepared by carrying out pure culture of microorganisms capable of degrading nitriles and cyanides selected from the genera Alcaligenes and Achromobacter singly or in a mixed state, adding the pure culture or cells thereof to an activated sludge and acclimating and propagating the same on the activated sludge according to the present invention.

We claim:

1. A process for the microbiological degradation of nitriles and cyanides contained in a waste water effluent which comprises
   (i) adding at least one microorganism capable of degrading nitriles and cyanides to an aqueous sludge, said microorganism being selected from the genera Alcanigenes and Achromobacter:
   (ii) acclimating said microorganism to said activated sludge; and
   (iii) passing a waste water effluent containing nitriles and cyanides through the thus acclimated sludge whereby the microbiological disintegration of the nitriles and cyanides is accomplished, thus purifying the waste water effluent.

2. A process according to claim 1, wherein the microorganism is a pure culture or cells obtained by culturing the microorganisms singly or in a mixed state in a culture medium aerobically.

3. A process according to claim 2, wherein the culture medium contains 0.01 to 0.05 w./v. percent of nitriles and 0.001 to 0.003 w./w. percent of cyanides.

4. A process of claim 1, wherein said microorganism is selected from the species *Alcaligenes viscolactis* and *Achromobacter nitriloclastes*.

5. A process of claim 1, wherein said microorganism is selected from the strains *Alcaligenes viscolactis* ATCC 21698 and *Achromobacter nitriloclastes* ATCC 21697.

6. A process of claim 5, wherein said microorganism is *Alcaligenes viscolactis* ATCC 21698.

7. A process of claim 5, wherein said microorganism is *Achromobacter nitriloclastes* ATCC 21697.

References Cited
UNITED STATES PATENTS 3,660,278   5/1972   Mimura et al. _____ 210—11

MICHAEL ROGERS, Primary Examiner